CONJOINT FACIA AND WATER DAM

Original Filed Jan. 7, 1970 3 Sheets-Sheet 1

INVENTOR

Julian J. Attaway

BY John B. Hunnicutt

ATTORNEY

CONJOINT FACIA AND WATER DAM

Original Filed Jan. 7, 1970 3 Sheets-Sheet 2

INVENTOR
Julian J. Attaway
BY John B. Sennetrout
ATTORNEY

CONJOINT FACIA AND WATER DAM

Original Filed Jan. 7, 1970 3 Sheets-Sheet 3

INVENTOR
Julian J. Attaway

By John B. Hennenhoeft

ATTORNEY

United States Patent Office

Re. 27,761

Reissued Sept. 18, 1973

27,761

CONJOINT FACIA AND WATER DAM

Julian J. Attaway, Tucker, Ga., assignor to Miscellaneous Manufacturing Corporation, Tucker, Ga.

Original No. 3,624,973, dated Dec. 7, 1971, Ser. No. 1,123, Jan. 7, 1970. Application for reissue Oct. 5, 1972, Ser. No. 298,803

Int. Cl. E04d *13/15*

U.S. Cl. 52—60 16 Claims

Matter enclosed in heavy brackets [ ] appears in the original patent but forms no part of this reissue specification; matter printed in italics indicates the additions made by reissue.

ABSTRACT OF THE DISCLOSURE

A conjoint facia and water dam for being installed on a roof deck is provided comprising facia and heading and keeper means, a cant, flashing means, and thrust means, the flashing means being characterized by having first and second wall and bearing components and an interconnecting bight portion for engaging the first wall and bearing component with keeper structure of the facia and heading and keeper means in a recess bordered by an upper facia and heading portion of the latter means for the flashing means to extend behind a facia wall of the facia and heading and keeper means having the facia wall upstanding from an end of a roof deck and the second wall and bearing component of the flashing means covering and bearing upon an end of roofing on the cant, the latter supported on the roof deck behind the facia wall, while the thrust means engages the second wall and bearing component of the flashing means with the facia and heading and keeper means in an area of the keeper structure of the latter located exteriorly of the recess for the flashing means to clamp the end of roofing under the second wall and bearing component to an inclined surface of the cant.

The present invention relates more generally to building structures and is more particularly concerned with a conjoint facia and water dam for being associated with a roof deck, and with an end of roofing leading from the roof deck.

In so-called deck roofs, which are characterized by having a low pitch or a substantially horizontal top surface, the introduction of a conjoint facia and water dam is favored in the architectural and construction fields for such reasons as that the installation enables roof water to be suitably controlled without spilling over the end of the deck. A conjoint facia and water dam accordingly used may also serve as a barrier for other material, such as gravel, on the roof deck. Further beneficially, a conjoint facia and water dam as installed contributes facia which leads upwardly outside the end of a roof deck and coextends with the face of the roof deck end to the top surface of the roof deck, thence terminating upwardly of the deck and the cant. Meanwhile, the cant is disposed on the deck top surface and has an inclined surface leading upwardly from the deck as the inclined surface progresses outwardly toward the plane of the roof deck end. Roofing laid on the deck top surface is raised up at an end onto the inclined surface of the cant, and flashing structure of the conjoint facia and water dam is added overlapping the roofing end on the cant and engaging with the upper end of the facia above the cant. In general the flashing is for sealing against water penetration and the resulting barrier represented by the conjoint roof deck facia and water dam, as installed, prevents water from spilling over the barrier, particularly when the deck roof is also equipped with one or more suitable water drains appropriately located entrantly behind the barrier.

An object of the present invention is to provide an improved conjoint facia and water dam which has utility as facia, as a roof water barrier and as a flashing interposed between the facia and a roofing end.

Another object of this invention is that of providing improvements in thrust application in a conjoint facia and water dam.

A further object herein is the provision of interlocking facia heading and keeper means and flashing in association with thrust means engaging the facia heading and keeper means and flashing in a conjoint facia and water dam, having the thrust means capable of exerting thrust upon the flashing with the latter acting upon a roofing end resting upon a cant incline, and reactively to have the thrust means favorably effective for transmitting thrust to the facia and heading and keeper means while the latter and the flashing remain interlocked.

Other objects of this invention in part will be obvious and in part pointed out more fully hereinafter.

A conjoint facia and water dam in accordance with the present invention is characterized by including facia and heading and keeper means having a normally downwardly open recess therein, flashing means, a cant, and thrust means. In the facia and heading and keeper means an upper facia and heading portion is provided bordering the recess. Keeper structure extends from the upper facia and heading portion for being engaged both for downward thrust application to the facia and heading and keeper means to be had in the recess and for upward thrust application to the facia and heading and keeper means to be had exteriorly of the recess. Moreover a lower facia portion of the facia and heading and keeper means extends from the upper facia and heading portion so that with the facia and heading and keeper means in a generally upright position the lower facia portion is suited to lead facially outside a downwardly extending end of a roof deck and upwardly of the roof deck end, having the upper facia and heading portion and the keeper structure above the roof deck and the recess aforementioned downwardly open. The cant is for occupying a position securely on the roof deck adjacent to the roof deck end and has an inclined surface for this surface to lead upwardly from the roof deck in progressing away from the roof deck along with an end of roofing toward the roof deck end. Further, the cant in its secured position on the roof deck relative to the generally upright position of the facia and heading and keeper means is that of being immediately behind the lower facia portion of the facia and heading and keeper means and below the aforementioned keeper structure and recess, for supporting an end of roofing on the inclined surface.

The flashing means in the conjoint facia and water dam comprises laterally opposite first and second wall and bearing components and a bight wall portion interconnecting these components for the flashing means to have the first wall and bearing component thereof engage with the keeper structure in the recess in a downward thrust transmitting relation to the facia and heading and keeper means in the generally upright position of the latter while having the second wall and bearing component coveringly above an end of roofing on the inclined surface of the cant for being pressed downwardly upon the end of roofing clampingly toward the inclined surface of the cant in the aforementioned position of the cant on a roof deck. Also in the foregoing positions of the facia and heading and keeper means and the cant, the thrust means and the keeper structure referred to are interrelated for the thrust means to engage the keeper structure exteriorly of the recess with the second wall and bearing component of the flashing means in an upward thrust transmitting relation to the facia and heading and keeper means and press the second wall and bearing component downwardly upon an end of roofing on the inclined surface of the cant clampingly toward the inclined surface while the facia and heading and keeper means receives downward thrust from the first wall and bearing component in engagement with the keeper structure in the recess.

In the accompanying drawings wherein several embodiments of this invention are represented:

Figure 3:
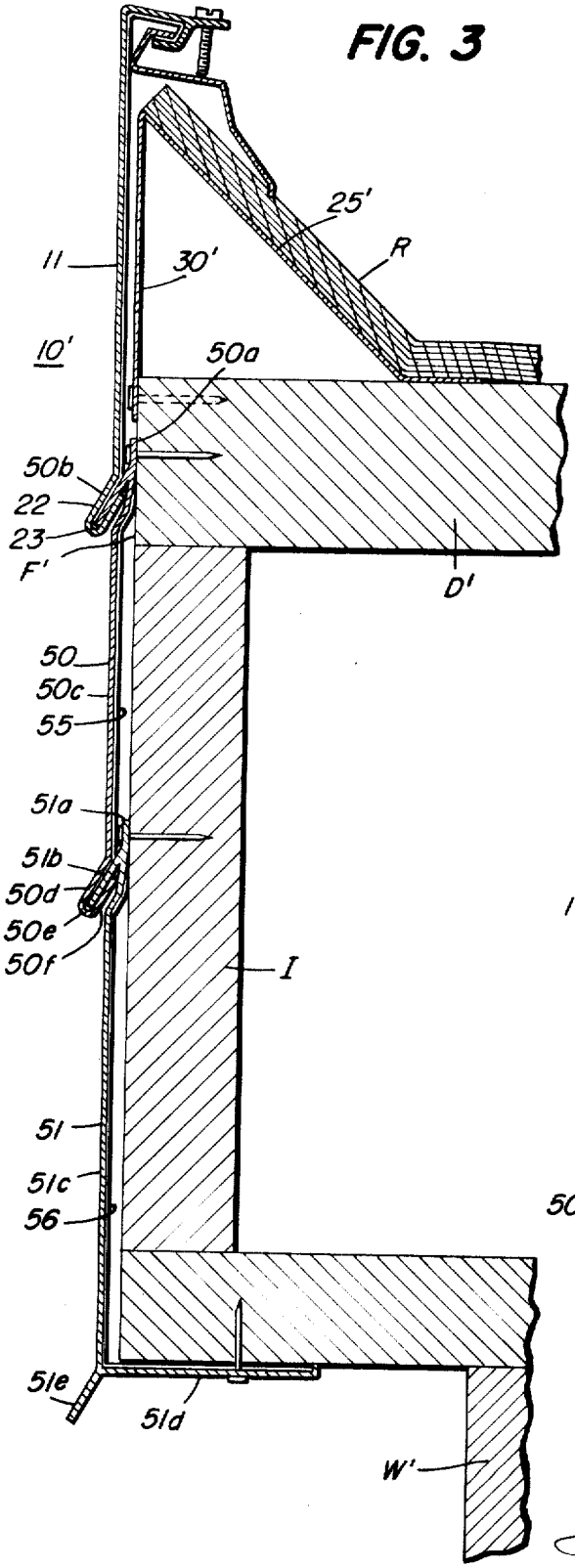
FIG. 3 is a view in vertical section representing a modified embodiment wherein a conjoint facia and water dam is indicated in association with a wall, a roof deck and roofing of a building.
Figure 5:
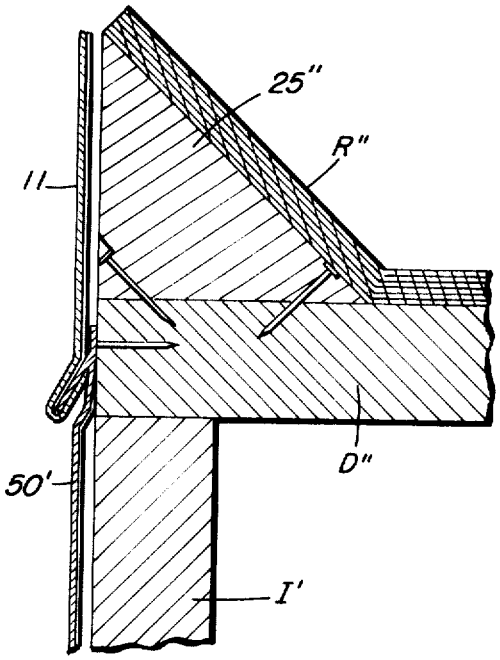
Figure 6:
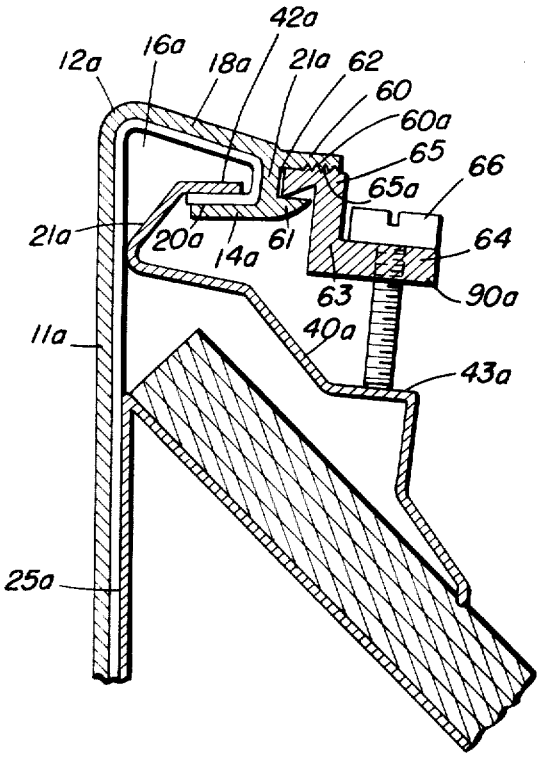
Figure 7:
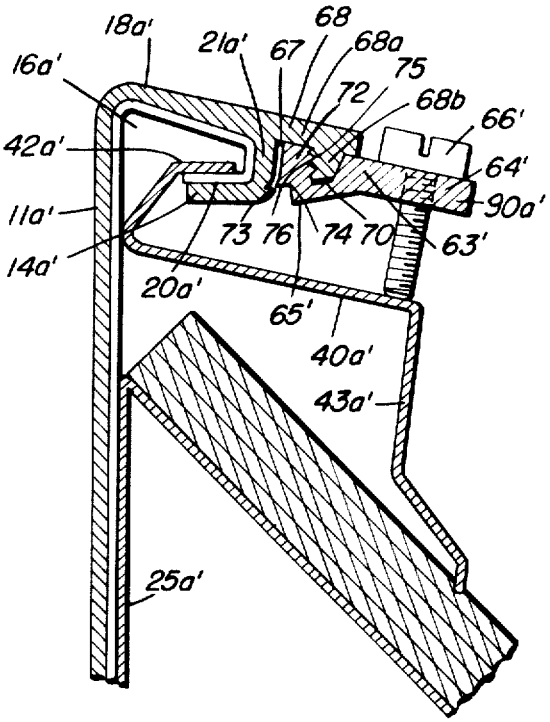
Figure 8:
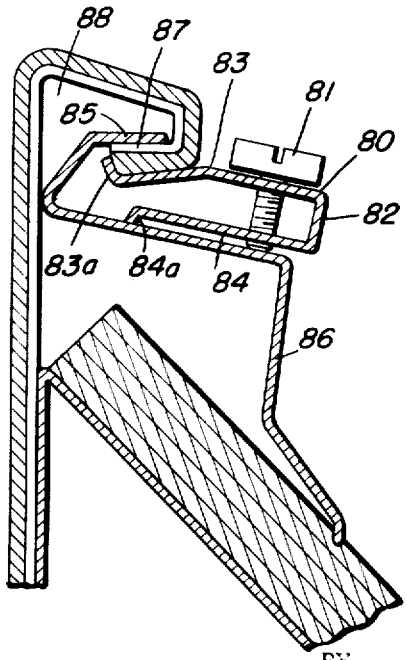

FIG. 5 is a vertical sectional localized view representing features of still another embodiment, the cant structure involved being of modified form, with the conjoint facia and water dam otherwise indicated being constructed and having an environment similar to the conjoint facia and water dam in the embodiment represented in FIG. 3; and FIGS. 6, 7 and 8 are respectively fragmentary vertical sectional views representing several embodiments wherein the conjoint roof deck facia and water dam is characterized by having thrust means thereof include lever structure.

Figure 1:
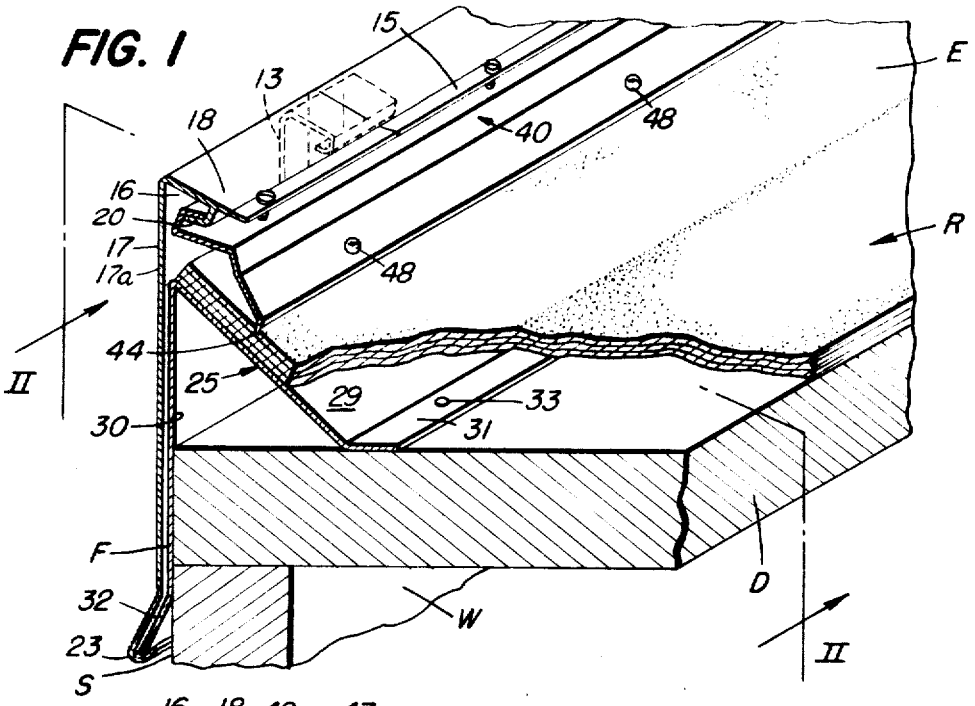
FIG. 1 is a perspective view with vertical cross section of a conjoint facia and water dam and of a building wall, roof deck and roofing with which the conjoint facia and water dam is associated.
Figure 2:
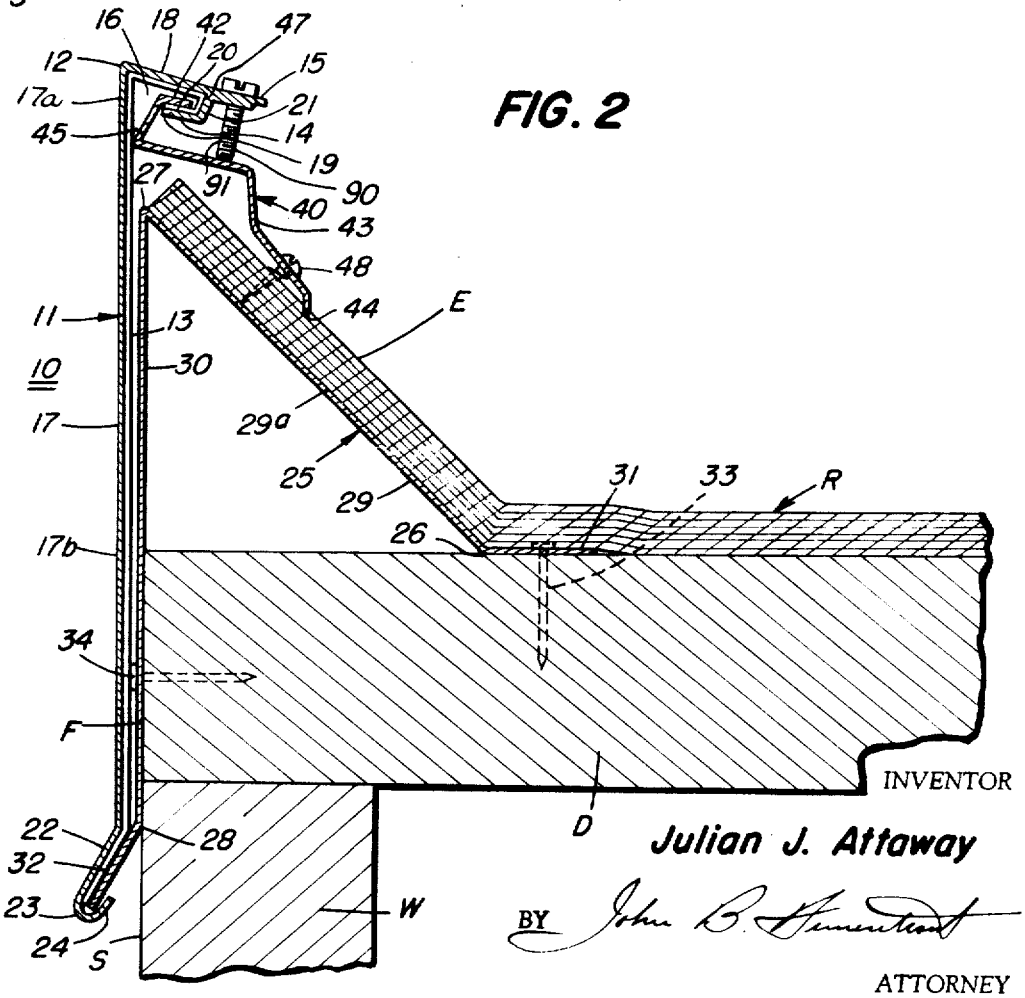
FIG. 2 is a vertical sectional elevation taken along line II—II in FIG. 1.

Referring now more especially to FIGS. 1 and 2 of the drawing, and to the embodiment represented therein, a conjoint facia and water dam, designated in general by the reference numeral 10, is mounted upon a building roof deck D which is supported on a building wall W, the latter having a vertical outside face S that is substanitally flush with the outside vertical end face F of the roof deck D. While only a fragment of the conjoint facia and water dam is depicted it will of course be understood that the conjoint facia and water dam actually produces a border, the latter longitudinally coextending with the roof deck end or ends which may be termed as being outside in the building. For simplicity of description for present purposes, it will be assumed that the roof deck D has but one outside end face, the end face F, and that the roof deck is exposed endwise over but one outside wall in the building, namely, the wall W having the outside face S. More generally, however, it will of course be understood that a border longitudinally coextending with two or more outside ends of a roof deck may be formed at those ends over corresponding outside supporting walls through use of the conjoint facia and water dam, and that lapping, splicing, mitering, or joints produced in any other suitable manner, may be included in installing the members of the conjoint facia and water dam to achieve desired longitudinal extent of the border for the prevention of water spill-off from the roof deck end or ends as the case may be.

Considering further the embodiment represented in FIGS. 1 and 2, the conjoint facia and water dam 10 includes a facia and heading and keeper member 11 which is characterized by having a recess 16 therein and by including an upper facia wall and head portion 12, and keeper structure comprising a first keeper component 14 and a second keeper component 15. The upper facia and head portion 12 is inclusive of an upper facia portion 17a of the facia wall 17 and a head component 18 which longitudinally and laterally border the recess 16 and the head component 18 is connected with the upper facia portion 17a and longitudinally and laterally leads behind the upper facia portion. Furthermore the upper facia and head portion 12 coextends longitudinally with the first and second keeper components 14 and 15 which project laterally therefrom, the first keeper component 14 forming a bight 21 with the head component 18 and the upper facia poriton 17a and the end of the first keeper component interposing a gap 19 leading entrantly into the recess 16 so that the recess thence leading laterally communicates from above with a surface 20 of the first keeper component 14 in the recess. The second keeper component 15 is connected with the bight 21 and is outside the recess 16. The arrangement is such that with the facia and heading and keeper member 11 situated in a given generally upright normal position of use as shown in FIGS. 1 and 2, a lower portion 17b of the facia wall 17 leads facially outside the downwardly extending end face F of the roof deck D and upwardly of the roof deck to the upper portion 17a of the facia wall, and the upper facia and head portion 12 and the first and second keeper components 14 and 15 accordingly are above the roof deck, with the recess 16 being upwardly entrant through gap 19 and thence extending laterally over surface 20 of the first keeper component. Also, in the present embodiment the first and second keeper components 14 and 15, being integral with a bight portion 21, project in generally opposite directions with reference to each other laterally with the end of the first keeper component 14 leading to the gap 19 as a projection toward the facia wall 17. Head component 18 in the normal position of use of member 11 leads laterally backwardly and at an acute angle downwardly with reference to upper portion 17a of the facia wall, and the second keeper portion 15 leads laterally backwardly from bight portion 21 and forms an obtuse angle with the head component 18, while the first keeper component 14 projects generally horizontally forwardly toward the facia wall 17 from bight portion 21 and has surface 20 upwardly in the recess 16. The facia and heading and keeper member 11 may for example be an extrusion or a product of rolling, made of aluminum alloy or from any other suitable material.

A cant member 25 of the conjoint roof deck facia and water dam 10, as will be seen in FIG. 1, is disposed in a position adjacent to the end face F of the roof deck D and is secured in that position to the roof deck. Cant member 25 is of angular transverse configuration, there being substantially parallel longitudinal arrises 26, 27 and 28 (FIG. 2) which delineate transverse longitudinal panels 29 and 30 and transverse longitudinal tongues 31 and 32 all of which are angularly related and integral at the corresponding longitudinal arrises 26, 27 and 28 for tongue 31 in the normal position of use of the cant member to rest upon the top surface of the roof deck while the transversely inclined surface 29a of the panel 29 leads upwardly from the roof deck in progressing away from the roof deck toward the vertical plane of the roof deck end surface F, with panel 30 being substantially upright leading outside the building wall surface S from arris 28 and outside the roof deck surface F to arris 27 above the roof deck. From arris 28 the tongue 32 leads downwardly and outwardly away from the building for being engaged. The securement of cant member 25 is effected by any suitable fastening means such as headed nails or screws 33 through the tongue 31 into the roof deck D and headed nails or screws 34 through the lower portion of panel 30 into the roof deck at face F at suitable spacing longitudinally of the cant member. The cant of the conjoint roof deck facia and water dam 10 includes one or more cant members 25 made of sheet material which is bent beforehand to produce the aforementioned arrises, panels and tongues, the sheet material being galvanized steel or of any other suitable type. The cant may of course be made available in longitudinal sections represented by the members 25 which in being installed are for example overlapped, spliced through use of a splice member of like configuration or otherwise suitably jointed at adjacent longitudinal ends to prolong the cant and to preserve continuity. Notably, in the present embodiment, the facia and heading and keeper member 11 is characterized by having a lower lateral hook wall extension 23 including a downwardly and outwardly directed lower facia wall end 22 of lower facia portion 17b forming a bight with an upwardly and inwardly directed hook wall end portion 24 for the lower hook wall extension 23 to be open in a generally upward direction in the normal position of use of the facia and heading and keeper member 11 to engage tongue 32 of the cant 25 and thus for the tongue 32 to restrain member 11 against upward movement while the facia wall 17 is outside the cant panel 30, with panel 29 and the inclined surface 29a thereof being below the upper facia and head portion 12, recess 16, and the first and second keeper components 14 and 15.

An example of structure whereby the conjoint roof deck facia and water dam 10 is prolonged with reference to the facia and heading and keeper member 11 by adding another one of the members 11 is indicated in FIGS. 1 and 2, wherein a liner and splice member 13 is configurated to conform substantially to the lateral inner facial contour of each facia and heading and keeper member 11 starting with having a leg laterally facially abutting surface 20 of the first keeper component 14 in recess 16 and progressing to the bight of the lower hook wall extension 23 and is installed to overlap the adjacent ends of the two members 11 accordingly. In certain embodiments, adjacent longitudinal ends of members 11 are instead simply overlapped one upon the other in prolongation of the conjoint roof deck facia and water dam. The joints may for example be concurrent with longitudinal joints (not shown) in the cant and staggered with reference to the latter joints.

Before completing installation of the conjoint roof deck facia and water dam 10, roofing R is laid upon the roof deck D and an end E of the roofing is brought up upon the inclined surface 29a of the cant member. The conjoint roof deck facia and water dam 10 furthermore includes a flashing member 40 wherein a bight wall portion 45 of wall structure interconnects laterally opposite first and second wall and bearing components 42 and 43 of the flashing member. The second wall and bearing component 43 longitudinally has an outer lateral end flange 44 which in the normal position of use of the flashing projects downwardly.

With the flashing member 40 engaging the first wall and bearing component 42 with the first keeper component 14 at surface 20 of the latter within the recess 16, the flashing member 40 leads out through gap 19 and the second wall and bearing component 43 covers end E of roofing R on the inclined surface 29a of cant panel 29, having the cant member 25 and the facia and heading and keeper member 11 in their aforementioned positions represented in FIGS. 1 and 2. In this manner, the second wall and bearing component 43 of the flashing member 40 is available for being pressed against the roofing end portion E clampingly toward the inclined surface 29a of the cant member 25 and accordingly have flange 44 bite supportingly and sealingly into the roofing end portion.

The combined roof deck facia and water dam 10 further includes thrust means 90 for interengaging the second wall and bearing component 43 with the second keeper component 15 of member 11 in the aforementioned positions of member 11 and cant member 25 represented in FIGS. 1 and 2. In these positions of the latter two members, and with the first wall and bearing component 42 engaging the first keeper component 14 against surface 20 in the recess 16, thrust is applied by the thrust means 90 and received by the second wall and bearing component 43 with the latter component thus pressing flange 44 into the roofing end E on the cant member 25 clampingly toward the inclined surface 29a of panel 29. Meanwhile the thrust means 90 in the connection thereof with the second keeper component 15 is reactively in a generally upward thrust transmitting relation to the facia and heading and keeper member 11. Thus, under thrust of the thrust means 90, the lower hook wall extension 23 of member 11 is forced upwardly against tongue 32 of the cant member 25 which retains member 11 in the installed position represented in FIGS. 1 and 2.

Thrust means 90 more particularly includes a plurality of screw threaded fasteners 91 which directly are threadedly engaged with the second keeper component 15 at spaced apart locations longitudinally along the conjoint roof deck facia and water dam 10, and are set having their shank ends thrusting upon the second wall and bearing component 43 for pressing the second wall and bearing component clampingly upon the roofing end E resting on the inclined surface of the cant member 25. If desired, thrust of the thrust means 90 upon the second wall and bearing component 43 of the flashing means may be supplemented by the force of screws 48 or other suitable fastening means which extend through apertures in the second wall and bearing component 43 and engage this component forcefully upon the roofing end E with the cant 25. Flashing member 40 may illustratively be an extrusion, or a product of rolling or of sheet bending, made of aluminum alloy or of any other suitable material. If desired a plurality of these flashing members 40 may be jointed at longitudinal ends thereof such as by overlapping those ends, or through use of a splice plate of similar cross section. Where the joint is made overlapping beneath one or more of the screw threaded fasteners 91 on the length of the conjoint roof deck facia and water dam 10 the fastener 91 is beneficial for compressionally securing the overlap or splice while exercising thrust upon the flashing for clamping the flashing to the roofing end. Joints between flashing members 40 may be concurrent with joints between facia and heading and keeper members 11 or may be staggered with reference to the latter joints as occasion may demand.

In the embodiment represented in FIG. 3, a conjoint cornice type roof deck facia and water dam 10' is provided for a building wherein the roof deck D' juts outwardly beyond an outside wall W' of the building and it has become desirable to extend the facia vertically and horizontally over intermediate vertical and return structure I of the building. In this particular embodiment the upper structure of the conjoint cornice type roof deck facia and water dam 10' may be the same as that of the conjoint roof deck facia and water dam 10 in FIGS. 1 and 2 except that the cant panel 30' forms a terminal lower end of the cant member 25' and the lower hook wall extension 23 is engaged with a facia and cornice extension wherein a first facia extension member 50 and a facia and cornice extension member 51 are provided. Member 50 has laterally marginally longitudinally thereof an upper end portion 50a secured as by nails or screws to outer end face F' of the roor deck D'. A downwardly and outwardly longitudinally laterally projecting upper tongue 50b of member 50 leads from the marginal upper end portion 50a and engages with the lower hook wall extension 23 of a facia and heading and keeper member 11, the character hereinbefore described with reference to FIGS. 1 and 2, for restraining the latter member against upward movement. At lower lateral end, the member 50 is characterized by having a downwardly and outwardly laterally projecting longitudinal facia leg 50d joined with the root of tongue 50b by the vertical facia wall portion 50c. An upwardly and inwardly laterally projecting longitudinal end portion 50f and the facia leg 50d are interconnected by a bight wall portion 50e thus forming a laterally downwardly and outwardly entrant longitudinal hook wall structure which engages a downwardly and outwardly laterally projecting longitudinal tongue 50b of the facia and cornice textension member 51, the latter having an upper marginal end portion 51a which is fastened to the intermediate wall I of the building. A vertical facia wall portion 51c of the facia and cornice extension member 51 leads from the root of tongue 51b vertically outside the intermediate wall I and forms a corner with a return wall leg portion 51d of the facia and cornice extension member 51, leg portion 51d being suitably secured as by nails or screws to a generally horizontal portion of the intermediate wall I. The outwardly and downwardly laterally projecting longitudinally facia leg 50d, as in the case of the downwardly and outwardly laterally projecting longitudinal facia wall leg portion 22 of the conjoint roof deck facia and water dam 10', serve to shed water when water flows on the facia. A downwardly and outwardly laterally directed longitudinal spur wall 51e of the facia and cornice wall extension member 51 leads from the corner formed by the vertical facia wall portion 51c and the return wall leg portion 51d and again serves as a water shed. Members 50 and 51 may for example be extrusions or products of rolling made of aluminum alloy or of any other suitable material. Each of the several members 50 and 51, and any of the other members of the conjoint cornice type roof deck facia and water dam 10', may have longitudinal continuance with a like member suitably joined thereto as already suggested with reference to the embodiment of FIGS. 1 and 2. In FIG. 3 it will be noted that the members 50 and 51 are associated with splice wall elements 55 and 56 which in conforming to the inner faces of these respective members, from lateral end to opposite lateral end of thte member, form a splice with the member, and a like member, not shown, on the length of the combined cornice type roof deck facia and water dam 10'.

Figure 4:
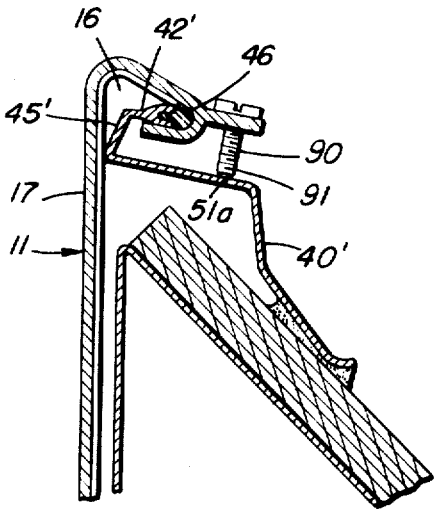
FIG. 4 is a fragmentary vertical sectional view representing a further embodiment and is more particularly concerned with a seal detail.

In certain embodiments the flashing means in interlocking with the facia and heading and keeper member includes elastomeric sealing means and disposes the sealing means toward the facia and heading and keeper means and sealingly against the latter means while thrust is being applied upon the flashing means by the thrust means. In the particular embodiment represented in FIG. 4, the conjoint facia and roof deck water dam is for example structurally the same as that described hereinbefore with reference to FIGS. 1 and 2, or with reference to FIG. 3, except that the end of the first wall and bearing component 42' of the flashing member 40' carries longitudinally continuously an elastomeric sealing member 46 protruding laterally from a longitudinal groove in the first wall and bearing component for pressing sealingly against the facia and heading and keeper member 11 within the recess 16 under the heeling action of bight wall portion 45' of the flashing member 40' against the facia wall 17.

In the embodiment represented in FIG. 5, the cant 25'' comprises a substantially right triangular longitudinal rail of wood or of any other suitable material secured to the roof deck, having the rail support on the inclined surface thereof a marginal end portion of roofing R'' leading up from the roof deck D''. Otherwise, the conjoint facia and water dam in which the cant 25'' is a component is for example similar to that represented in FIG. 3.

In other illustrative embodiments of the present invention, a conjoint roof deck facia and water dam is provided similar to any of the foregoing described herein but differing in the respect that the keeper structure of the facia and heading and keeper means and the structure of the thrust means are of modified form for being engaged to have the thrust means reactively transmit upward thrust to the facia and heading and keeper means. Thus, in the embodiment represented in FIG. 6 a conjoint roof deck facia and water dam is provided including a facia and heading and keeper member 11a, a cant member 25a, flashing means 40a and at least one thrust unit 90a. The cant and the flashing means are for example constructed and arranged similarly to those in the embodiment represented in FIGS. 1 and 2 and so is the facia and heading and keeper member 11a except that the bight portion 21a interconnecting the head component 18a with the first keeper component 14a, for the latter to present bearing surface 20a in the recess 16a, is integral with normally upper and lower flanges 60 and 61 which coextend longitudinally with the upper facia and head portion 12a and laterally project rearwardly thereof forming a laterally rearwardly open longitudinal groove 62 with the bight portion 21a externally of the recess 16a. Furthermore, thrust unit 50a comprises lever structure 63 having a first end portion 64 and an opposite second end portion 65 with the thrust unit also having at least one screw threaded fastener 66 threadedly engaged with the first end portion 64 of the lever structure. In the arrangement as shown and presently preferred it will be understood each screw threaded fastener 66 is a set screw having its shank extending through an aperture wherein the set screw is directly threadedly engaged with the lever structure 63. If desired, a plurality of the thrust units 90a may be used as clips spaced apart from each other longitudinally along the facia and heading and keeper member 11a for engaging the flashing means or in certain instances the lever structure 63 may extend substantially continuously longitudinally with the flashing means and the facia and heading and keeper means in the conjoint roof deck facia and water dam thus having a plurality of screw threaded fasteners 66 threadedly engaged with the lever structure at locations longitudinally along the lever structure. The second end portion 65 of the lever structure of the thrust unit comprises a tongue entrantly into the groove 62 afforded in the facia and heading and keeper member 11a for the tongue to interlock laterally with the upper and lower flanges 60 and 61 and thus transmit upward thrust to the facia and heading and keeper member 11a with the thrust unit 90a having the screw threaded fastener or screw threaded fasteners 66, as the case may be, set pressingly upon the second wall and bearing component 43a of the flashing means 40a to engage an end of roofing on the inclined surface of the cant member 25a clampingly toward that inclined surface while the second wall and bearing component 42a of the flashing means 40a is engaged against surface 20a of the first keeper component 14a in the recess 16a and is transmitting downward thrust to the facia and heading and keeper member 11a. To assure more positive interlock between the upper and lower flanges 60 and 61 with the lever structure 63 under lateral thrust, the lower flange 61 is formed to project upwardly at its outer end in the normal position of use of the facia and heading and keeper member 11a and the tongue which the second end portion 65 of the lever structure 63 introduces projects downwardly in the groove 62 in interlock with the lower flange 61 while pressing laterally upwardly against the upper flange 60. Also, the upper flange 60 at its downward inner face in the groove 62 has ribs 60a and the tongue at upper face in this same groove has ribs 65a for the ribs on the flange and on the tongue to mesh under thrust of the thrust unit 90a thus to achieve more positive interlock.

In the embodiment of FIG. 7, the conjoint roof deck facia and water dam is similar to that of FIG. 6 with the facia and heading and keeper member 11a', however, providing a laterally normally upwardly entrant longitudinal groove 67 introduced by keeper structure 68 and the bight portion 21a', the latter connecting the head component 18a' with the first keeper component 14a' of the facia and heading and keeper member 11a' in a manner already explained with reference to other embodiments herein. A web 68a of the keeper structure 68 leads from the juncture of the head component 18a' and bight portion 21a' of member 11a' and supports integrally a tongue 68b which laterally projects downwardly from the web portion. Also, in the embodiment of FIG. 7, the conjoint roof deck facia and water dam includes at least one thrust unit 90a' which comprises lever structure 63' having a first end portion 64' and an opposite second end portion 65', and the thrust unit furthermore includes screw threaded fastener means 66' threadedly engaged with the first end portion 64' of the lever structure. The second end portion 65' of the lever structure of the thrust unit forms a normally downwardly entrant groove 70 which is bordered by a laterally upwardly projecting end arm 72 of the second end portion 65' so that with lever structure 63' receiving the downwardly projecting tongue 68b in the normally downwardly entrant groove 70 the laterally upwardly projecting end arm 72 is received in the normally upwardly entrant groove 67 for the tongue 68b and the second end portion 65' of the lever structure to interlock laterally of the tongue in an upward thrust transmitting relation having the threaded fastener means 66' set pressingly upon the second wall and bearing component 43a' of the flashing means 40a to engage an end of roofing on the inclined surface of the cant member 25a' clampingly toward that inclined surface while the second wall and bearing component 42a' of the flashing means 40a' is engaged against surface 20a' of the first keeper component 14a' in the recess 16a' and is transmitting downward thrust to the facia and heading and keeper member 11a. Bight portion 21a' and lever end arm 72 advantageously include stop ledge portions 73 and 74 respectively which engage the lever structure 63' with the facia and heading and keeper means 11a' during installation of the thrust unit 90a' before the threaded fastener means 66' is set to develop thrust against the flashing means 40a'. Also, to enhance the interlock had between the thrust unit 90a' and tongue 68b the tongue preferably is tapered having its laterally opposite sides converging downwardly companion to having the laterally opposite sides of the second end portion 65' of the lever structure 63' upwardly divergent and with there being ribs 75 on the lateral face of arm 72 in the groove 70 and ribs 76 on the lateral face of tongue 68b which is toward the rib 75 for the ribs 75 and 76 to mesh under thrust when the thrust unit 90a' is applied against the flashing means 40a' and rises wedgingly on the tapered tongue 68b.

According to certain embodiments of the present invention a conjoint roof deck facia and water dam is provided characterized in that the thrust means includes resilient fastener means comprising first and second arm means, for the resilient fastener means to be resiliently sprung into pressure exercising relation wherein the first arm means of the resilient fastener means and the keeper structure are engaged having the thrust means in an upward thrust transmitting relation to the facia and heading and keeper means, and the second arm means of the resilient fastener means and the second wall and bearing component of the flashing means are engaged having the second arm means press the second wall and bearing component upon an end of roofing on the inclined surface of the cant means clampingly toward the inclined surface, while the keeper structure and the first wall and bearing component of the flashing means are engaged with the facia and heading and keeper means and the cant means in their installed positions. In the embodiment of FIG. 8, the thrust means 80 not only comprises resilient fastener means 82 of the immediately preceding character, but beneficially further includes screw threaded fastener means 81 threadedly engaged rearwardly of the ends of the first and second arm means 83 and 84 of the resilient fastener means 82 for the screw threaded fastener means 81 to press downwardly upon the second wall and bearing component 86 of the flashing means rearwardly of where the end 83a of the first arm means and the keeper structure 87 are engaged and rearwardly of where the end 84a of the second arm means engages the second wall and bearing component 86, so as to have thrust of the resilient fastener means 82 upon an end of roofing on the inclined surface of the cant clampingly toward that inclined surface enhanced by thrust of the screw threaded fastener means upon the second wall and bearing component 86. As the facia and heading and keeper means, the cant means, and the flashing means are longitudinally prolonged such as by adding or jointing one or more members of the same, the thrust means 80 may either substantially coextend longitudinally as the conjoint roof deck facia and water dam is prolonged or instead include a plurality of fastener units at different locations longitudinally along the conjoint roof deck facia and water dam. In each such fastener unit the screw threaded fastener means 81 is characterized by including one or more screws with the latter being in number depending upon such factors as the extent of the fastener unit longitudinally of the conjoint roof deck facia and water dam and so as to occur in the fastener unit or units at appropriate locations along the length of the conjoint roof deck facia and water dam.

The arrangement according to FIG. 8 will also be understood as having the screw or screws in the fastener unit extending through apertures in the first and second arm means 83 and 84 and threadedly engaged with the resilient fastener means 82 rearwardly of ends 83a and 84a, having the screw shank ends project from the second arm means 84 for thrust to be exercised. Keeper structure 87 of the facia and heading and keeper means occurs as a projection defining a gap with the facia, with the resulting gap leading into a recess 88 in the upper portion of the facia and heading and keeper means. A first wall and bearing component 85 of the flashing means meanwhile is engaged with the keeper structure 87 inside the recess 88 in a downward thrust exercising relation to the facia and heading and keeper means while end 83a of the first arm means 83 of the fastener unit engages the projecting keeper structure 87 exteriorly of the recess 88 for the fastener unit to transmit upward thrust to the facia and heading and keeper means. The second wall and bearing component 86 of the flashing means meanwhile receives thrust from the related screw shank end or ends of the screw threaded fastener means 81 rearwardly of the ends 83a and 84a of the first and second arm means of the fastener unit and acts clampingly upon an end of roofing on the inclined surface of the cant means.

As the present invention lends itself to many possible embodiments and as many possible changes still in accordance with the invention may be made in the embodiments hereinbefore set forth, it will be distinctly understood that all matter described herein is to be interpreted as illustrative and not as a limitation.

I claim:

1. In a conjoint roof deck facia and water dam, the combination which includes: facia and heading and keeper means having a normally downwardly open recess therein and comprising an upper facia and heading portion bordering said recess, keeper structure extending from said upper facia and heading portion and including an interior keeper portion having a surface in said recess for being engaged for downward thrust application to be had to said facia and heading and keeper means in said recess and an exterior keeper portion exteriorly of said recess to be engaged for upward thrust application to said facia and heading and keeper means to be had exteriorly of said recess, a lower facia portion extending from said upper facia and heading portion so that with said facia and heading and keeper means in a generally upright position said lower facia portion is suited to lead facially outside a downwardly extending end of a roof deck and upwardly of the roof deck end, having said upper facia and heading portion and said keeper structure above the roof deck and said recess downwardly open; cant means having an inclined surface for said cant means securely in a position on a roof deck adjacent to an end of the latter to support an end of roofing on said inclined surface [of said cant means] *having the latter lead rearwardly and* downwardly below said recess and said keeper structure and behind said lower facia portion, with said facia and heading and keeper means being in said generally upright position [, and with said inclined surface of said cant means leading upwardly with the roofing end from the roof deck in progressing from the roof deck toward the roof deck end]; flashing means comprising laterally opposite first and second wall and bearing components and a bight wall portion interconnecting said first and second wall and bearing components, for said flashing means to have said first wall and bearing component engage with said surface of said interior keeper portion in said recess in a downward thrust bearing relation upon said facia and heading and keeper means in said generally upright position of the latter while having said second wall and bearing component coveringly above an end of roofing on said inclined surface of said cant means for being pressed downwardly upon the end of roofing clampingly toward said inclined surface in said position of said cant means on a roof deck; and thrust means bearing upon said exterior keeper portion exteriorly of said recess and upon said second wall and bearing component of said flashing means and applying thrust upwardly to said facia and heading and keeper means for pressing said second wall and bearing component downwardly upon an end of roofing on said inclined surface of said cant means clampingly toward said inclined surface while said facia and heading and keeper means receives downward thrust from said first wall and bearing component in engagement with said surface of said interior keeper portion in said recess, in said positions of said facia and heading and keeper means and said cant means.

2. In a conjoint roof deck facia and water dam, the combination as set forth in claim 1 wherein said lower facia portion has a generally upwardly open hook wall extension downwardly entrantly to be restrained against upward movement under upward thrust received by said facia and heading and keeper means from said thrust means in engagement with said exterior keeper portion exteriorly of said recess while said first wall and bearing component is engaged with said surface of said interior keeper portion interiorly of said recess and is applying downward thrust to said facia and heading and keeper means and said second wall and bearing component presses upon an end of roofing on said inclined surface of said cant means clampingly toward said inclined surface under thrust upon said second wall and bearing component from said thrust means in said positions of said facia and heading and keeper means and said cant means.

3. In a conjoint roof deck facia and water dam, the combination as [as] set forth in claim 1 wherein said thrust means includes a plurality of fastener units for engaging said exterior keeper portion exteriorly of said recess in an upward thrust applying relation to said facia and heading and keeper means at spaced apart locations longitudinally along the conjoint roof deck facia and water dam and pressing said second wall and bearing component against an end of roofing on said inclined surface of said cant means clampingly toward said inclined surface while said interior keeper portion supports said first wall and bearing component interiorly of said recess.

4. In a conjoint roof deck facia and water dam, the combination as set forth in claim 3 wherein each of said fastener units includes a screw threaded fastener having an end abutting said second wall and bearing component in said positions of said facia and heading and keeper means and said cant means, for pressing said second wall and bearing component upon an end of roofing on said inclined surface while said interior keeper portion supports said first wall and bearing component interiorly of said recess.

5. In a conjoint roof deck facia and water dam, the combination as set forth in claim 4 wherein said screw threaded fastener extends through an aperture in said exterior keeper portion exteriorly of said recess and is engaged with said exterior keeper portion, having an end abutting said second wall and bearing component in said positions of said facia and heading and keeper means and said cant means, for pressing said second wall and bearing component upon an end of roofing on said inclined surface of said cant means clampingly toward said inclined surface while said interior keeper portion supports said first wall and bearing component interiorly of said recess.

6. In a conjoint roof deck facia and water dam, the combination as set forth in claim 1 wherein said thrust means includes at least one fastener unit, said unit comprising lever structure which includes first and second end portions, and screw threaded fastener means engaging said first end portion of said lever structure and for pressing said second wall and bearing component of said flashing means, and said second end portion of said lever structure forming an interlocking connection with said exterior keeper portion exteriorly of said recess for transmitting upward thrust of said screw threaded fastener means to said facia and heading and keeper means while said second wall and bearing component of said flashing means clamps an end of roofing on said inclined surface of said cant means under thrust of said screw threaded fastener means and said interior keeper portion supports said first wall and bearing component interiorly of said recess.

7. In a conjoint roof deck facia and water dam, the combination as set forth in claim 6 wherein said exterior keeper portion and said second end portion of said lever structure in said connection include a tongue and a pair of laterally spaced flanges for said tongue to sustain interlock with said flanges laterally of said flanges under thrust of said screw threaded fastener means.

8. In a conjoint roof deck facia and water dam, the combination as set forth in claim 7 wherein said tongue and at least one of said flanges laterally facially include ribs, and said ribs on said tongue mesh with said ribs said flange when said tongue interlocks with said flanges laterally of said flanges.

9. In a conjoint roof deck facia and water dam, the combination as set forth in claim 1 wherein said thrust means includes resilient fastener means comprising first and second arm means and bight means interconnecting said first and second arm means, for said resilient fastener means to be resiliently sprung into pressure exercising relation wherein said first arm means and said exterior keeper portion are engaged externally of said recess having said thrust means in an upward thrust transmitting relation to said facia and heading and keeper means, and said second arm means and said second wall and bearing components of said flashing means are engaged having said second arm means press said second wall and bearing component upon an end of roofing on said inclined surface of said cant means clampingly toward said inclined surface, while said interior keeper portion and said first wall and bearing component of said flashing means are engaged interiorly of said recess in said positions of said facia and heading and keeper means and said cant means.

10. In a conjoint roof deck facia and water dam, the combination as set forth in claim 9 wherein said thrust means further includes screw threaded fastener means and said screw threaded fastener means engaging said resilient fastener means rearwardly of ends of said first and second arm means for said screw threaded fastener means to press downwardly upon said second wall and bearing component rearwardly of where said end of said first arm means and said exterior keeper portion are engaged under thrust of said resilient fastener means and rearwardly of where said end of said second arm means and said second wall and bearing component are engaged under thrust of said resilient fastener means.

11. In a conjoint roof deck facia and water dam, the combination which includes: a facia and heading and keeper member having a normally downwardly open recess therein and comprising, an upper facia and [head] *heading* portion bordering said recess and frontally including an upper facia portion of said facia and heading and keeper member and a header component connected with said upper facia portion and leading behind said upper facia portion, keeper structure including a forward projection and interior and exterior keeper portions connected with said header component and said forward projection forming a gap with said upper facia portion with said forward projection and said interior keeper portion having a surface in common interiorly of said recess for downward thrust application on said surface to said facia and heading and keeper member to be had and said exterior keeper portion extending to be engaged exteriorly of said recess for receiving upward thrust application to said facia and heading and keeper member exteriorly of said recess, and a lower facia portion extending from said upper facia portion so that with said facia and heading and keeper member in a generally upright position said lower facia portion is suited to lead facially outside a downwardly extending end of a roof deck and upwardly of the roof deck end, having said upper facia and heading portion and said keeper structure above the roof deck and said recess downwardly open, a cant having an inclined surface for said cant securely in a position on a roof deck adjacent to an end of the latter to support an end roofing on said inclined surface *having the latter said surface lead rearwardly and* downwardly below said upper facia and [head] *heading* portion and said keeper structure and behind said lower facia portion, with said facia and heading and keeper member being in a generally upright position [, and with said inclined surface leading upwardly with the roofing end from the roof deck in progressing from the roof deck toward the roof deck end]; flashing means comprising laterally oposite first and second wall and bearing components and a bight wall portion interconnecting said first and second wall and bearing components, for said flashing means to lead through said gap having said first wall and bearing component engage with said surface of said forward projection and said interior keeper portion in a downward thrust bearing relation upon said facia and heading and keeper member in said generally upright position of the latter while having said second bearing component coveringly above an end of roofing on said inclined surface of said cant means for being pressed downwardly upon the end of roofing clampingly toward said inclined surface in said position of said cant on a roof deck; and thrust means engaging said exterior keeper portion exteriorly of said recess and bearing upon said second wall and bearing component of said flashing means in an upward thrust transmitting relation to said facia and heading and keeper member for pressing said second wall and bearing component downwardly upon an end of roofing on said inclined surface of said cant clampingly toward said inclined surface while said facia and heading and keeper member [receive] *receives* downward thrust from said first wall and bearing component in engagement with said surface of said *forward projection and said* interior keeper portion, in said positions of said facia and heading and keeper member and said cant.

12. In a conjoint roof deck facia and water dam, the combination as set forth in claim 11 wherein said lower facia portion has a generally upwardly open hook wall extension downwardly entrantly to be restrained against upward movement under upward thrust received by said facia and heading and keeper member from said thrust means in engagement with said exterior keeper portion exteriorly of said recess while said first wall and bearing component is engaged with said surface of said forward projection and said interior keeper portion and is applying downward thrust to said facia and heading and keeper member at said surface of said projection and interior keeper portion interiorly of said recess and said second wall and bearing component presses upon an end of roofing on said inclined surface of said cant clampingly toward said inclined surface under thrust applied upon said said second wall and bearing component by said thrust means in said positions of said facia and heading and keeper member and said cant.

13. In a conjoint roof deck facia and water dam, the combination as set forth in claim 11 wherein said exterior keeper portion includes a flange extending rearwardly of said upper facia and [head] *heading* portion from said [head] *header* component and there are apertures in said flange at spaced apart locations longitudinally along said nonjoint roof deck facia and water dam, and said thrust means includes screw threaded fasteners through said apertures and engaged for thrusting upwardly upon said flange while ends of said screw threaded fasteners press said second wall and bearing component against an end of roofing on said inclined surface of said cant clampingly toward said inclined surface and while said first wall and bearing component of said flashing means is applying downward thrust to said facia and heading and keeper member against said surface of said forward projection and said interior keeper portion in said positions of *said* facia and heading and keeper member and said cant.

14. In a conjoint roof deck facia and water dam, the combination as set forth in claim 11 wherein said thrust means includes at least one fastener unit, said unit comprising lever structure which comprises first and second end portions, and screw threaded fastener means engaging said first end portion of said lever structure and for pressing said second wall and bearing component of said flashing means, and said second end portion of said lever structure forming an interlocking connection with said exterior keeper portion exteriorly of said recess for transmitting upward thrust of said screw threaded fastener means to said facia and heading and keeper member while said second wall and bearing component of said flashing means clamps an end of roofing on said inclined surface of said cant under thrust of said screw threaded fastener means and said interior keeper portion supports said first wall and bearing component interiorly of said recess.

15. In a conjoint roof deck facia and water dam, the combination as set forth in claim 11 wherein said thrust means includes: screw and resilient fastener means comprising first and second arm means and bight means interconnecting said first and second arm means for said resilient fastener means to be resiliently sprung into pressure exercising relation wherein said first arm means and said exterior keeper portion are engaged exteriorly of said recess and said second arm means and said second wall and bearing component of said flashing means are engaged, having said second arm means press said second wall and bearing component upon an end of roofing on said inclined surface of said cant means clampingly toward said inclined surface while said surface of said forward projection and said interior keeper portion is engaged interiorly of said recess *by said first wall and bearing component at said flashing means* in said positions of said facia and heading and keeper member, and screw threaded fastener means engaged with said resilient fastener means rearwardly of ends of said first and second arm means for said screw threaded fastener means to press downwardly upon said second wall and bearing component rearwardly of where said first arm means and said exterior keeper portion are engaged under thrust of said resilient fastener means and rearwardly of where said second arm means and said second wall and bearing component are engaged under thrust of said resilient fastener means.

*16. In a conjoint roof deck facia and water dam, the combination which includes: facia and heading and keeper means having a normally downwardly open recess therein and comprising an upper facia and heading portion bordering said recess, keeper structure extending from said upper facia and heading portion and including an interior keeper portion having a surface in said recess for being engaged for downward thrust application to be had to said facia and heading and keeper means in said recess*

*and an exterior keeper portion exteriorly of said recess to be engaged for upward thrust application to said facia and heading and keeper means to be had exteriorly of said recess, a lower facia portion extending from said upper facia and heading portion so that with said facia and heading and keeper means in a generally upright position said lower facia portion is suited to lead facially outside a downwardly extending end of a roof deck and upwardly of the roof deck end, having said upper facia and heading portion and said keeper structure above the roof deck and said recess downwardly open; cant means having an inclined surface for said cant means securely in a position on a roof deck adjacent to an end of the latter to support an end of roofing on said inclined surface having the latter said surface lead rearwardly and downwardly below said recess and said keeper structure and behind said lower facia portion, with said facia and heading and keeper means being in said generally upright position; and flashing and thrust means, the latter said means including flashing means comprising laterally opposite first and second wall and bearing components and a bight wall portion interconnecting said first and second wall and bearing components, for said flashing means to have said first wall and bearing component engage with said surface of said interior keeper portion in said recess in a downward thrust bearing relation upon said facia and heading and keeper means in said generally upright position of the latter while having said second wall and bearing component coveringly above an end of the roofing on said inclined surface of said cant means for being pressed*

*downwardly upon the end of roofing clampingly toward said inclined surface in said position of said cant means on a roof deck, and thrust means bearing upon said exterior keeper portion exteriorly of said recess and applying thrust to said flashing means and upwardly to said facia and heading and keeper means for urging said second wall and bearing component downwardly upon an end of roofing on said inclined surface of said cant means clampingly toward said inclined surface while said facia and heading and keeper means receives downward thrust from said first wall and bearing component in engagement with said surface of said interior keeper portion in said recess, in said positions of said facia and heading and keeper means and said cant means.*

References Cited

The following references, cited by the Examiner, are of record in the patented file of this patent or the original patent.

UNITED STATES PATENTS

| | | | |
|---|---|---|---|
| Re. 26,056 | 7/1966 | Hickman | 52—60 X |
| 3,503,162 | 3/1970 | Ward | 52—60 |
| 3,533,201 | 10/1970 | Tyler | 52—60 |
| 3,571,992 | 3/1971 | Comiskey | 52—60 |

PRICE C. FAW, Jr., Primary Examiner

U.S. Cl. X.R.

52—94